United States Patent
Hisada et al.

(10) Patent No.: US 10,464,386 B2
(45) Date of Patent: Nov. 5, 2019

(54) SUSPENSION STRUCTURE OF UTILITY VEHICLE

(71) Applicant: KAWASAKI JUKOGYO KABUSHIKI KAISHA, Hyogo (JP)

(72) Inventors: Kazumasa Hisada, Hyogo (JP); Gary Bozych, Irvine, CA (US); Nobuyuki Nishiguchi, Irvine, CA (US); Takeru Ohshima, Irvine, CA (US); Yusuke Nakashima, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 147 days.

(21) Appl. No.: 15/386,294

(22) Filed: Dec. 21, 2016

(65) Prior Publication Data

US 2018/0170135 A1    Jun. 21, 2018

(51) Int. Cl.
*B60G 3/20* (2006.01)
*B60G 15/06* (2006.01)
*B62D 23/00* (2006.01)
*B60R 21/13* (2006.01)

(52) U.S. Cl.
CPC .............. *B60G 15/067* (2013.01); *B60G 3/20* (2013.01); *B60G 3/202* (2013.01); *B62D 23/005* (2013.01); *B60G 2200/14* (2013.01); *B60G 2200/1442* (2013.01); *B60G 2200/182* (2013.01); *B60G 2200/422* (2013.01); *B60G 2202/312* (2013.01); *B60G 2204/129* (2013.01); *B60G 2204/143* (2013.01); *B60G 2204/148* (2013.01); *B60G 2204/422* (2013.01); *B60G 2206/10* (2013.01); *B60G 2206/50* (2013.01); *B60G 2300/07* (2013.01); *B60G 2300/27* (2013.01); *B60R 21/13* (2013.01); *B60Y 2200/124* (2013.01); *B60Y 2306/01* (2013.01); *B60Y 2410/124* (2013.01)

(58) Field of Classification Search
CPC ........ B60G 15/067; B60G 15/06; B60G 3/18; B60G 3/20; B60G 3/202; B60G 3/205; B60G 3/285; B60G 2206/50; B60G 2200/182; B60G 2200/18; B60G 2200/1442; B60G 2200/144; B60G 2200/14; B60G 2300/07; B60G 2204/129; B60G 2204/148; B60G 2204/143; B60G 2204/422; B60Y 2410/124
USPC .... 280/124.138, 124.143, 124.128, 124.153, 280/124.135, 124.136, 93.512
See application file for complete search history.

(56) References Cited

U.S. PATENT DOCUMENTS

| | | | | |
|---|---|---|---|---|
| 4,832,363 A | * | 5/1989 | Mitobe | B60G 3/202 280/124.128 |
| 4,986,567 A | * | 1/1991 | Kubo | B60G 3/22 280/124.131 |
| 5,009,449 A | * | 4/1991 | Edahiro | B60G 3/22 280/124.133 |
| 2014/0103627 A1 | | 4/2014 | Deckard et al. | |

* cited by examiner

Primary Examiner — Keith J Frisby
(74) Attorney, Agent, or Firm — Wenderoth, Lind & Ponack, L.L.P.

(57) ABSTRACT

A suspension structure of a utility vehicle includes a frame, a wheel, and a trailing arm including an arm extending anteroposteriorly and supported by the frame, a knuckle rotatably supporting the wheel, and a rotary shaft configured to angularly displace the knuckle in a vehicle width direction with respect to the arm.

2 Claims, 6 Drawing Sheets

SUSPENSION STRUCTURE OF UTILITY VEHICLE

BACKGROUND OF THE INVENTION

1. Field of the Invention

The present invention relates to a suspension structure of a utility vehicle.

2. Description of the Related Art

There has conventionally been known a utility vehicle having a rear wheel suspension structure including a trailing arm, as disclosed in US 2014/0103627 A.

SUMMARY OF THE INVENTION

Higher toe controllability of a wheel is required for improvement in turning performance of a utility vehicle.

In view thereof, an object of the present invention is to provide a suspension structure of a utility vehicle, which improves toe controllability of a wheel.

In order to achieve the object, the present invention provides a suspension structure of a utility vehicle, including: a frame; a wheel; and a trailing arm including an arm extending anteroposteriorly and supported by the frame, a knuckle rotatably supporting the wheel, and a rotary shaft configured to angularly displace the knuckle in a vehicle width direction with respect to the arm.

In this configuration, the rotary shaft angularly displaces the knuckle in the vehicle width direction with respect to the arm to achieve higher toe controllability of the wheel.

The suspension structure of the utility vehicle according to the present invention is preferred to further include any of the following configurations.

(1) The suspension structure further includes: a first rod and a second rod aligned to be paired vertically, each extending in the vehicle width direction and having a first end supported by the frame and a second end supported by the knuckle.

(2) The suspension structure further includes: a third rod extending in the vehicle width direction and having a first end supported by the frame and a second end supported by the arm or the knuckle.

(3) In the configuration (2), the third rod is supported ahead of the center of the knuckle, and the first rod and the second rod are supported behind the center of the knuckle.

(4) The suspension structure further includes: a shock absorber extending vertically and having a first end supported by the frame and a second end supported by the arm.

In the configuration (1), the first rod and the second rod achieve toe control as well as control in change amount of a camber angle.

In the configuration (2), the third rod achieves further improvement in toe controllability.

The third rod and the first and second rods are supported by the knuckle at positions shifted oppositely in the anteroposterior direction from the center of the knuckle in the configuration (3), to easily achieve control in change amount of the camber angle with the first rod and the second rod as well as improvement in toe controllability with the third rod.

The configuration (4) causes the arm to support the shock absorber that can thus be reduced in size in comparison to a case of being supported by the knuckle.

The present invention thus provides a suspension structure of a utility vehicle, which achieves higher toe controllability of a wheel with a trailing arm.

DETAILED DESCRIPTION OF THE INVENTION

A utility vehicle including a suspension structure according to an embodiment of the present invention will now be described below with reference to the accompanying drawings. For convenience of description, assume that the utility vehicle travels "forward" with respect to the utility vehicle and respective components, and right and left sides in the vehicle width direction of a crew boarding the utility vehicle directed forward correspond to "right and left sides" of the utility vehicle and these components.

Figure 1:
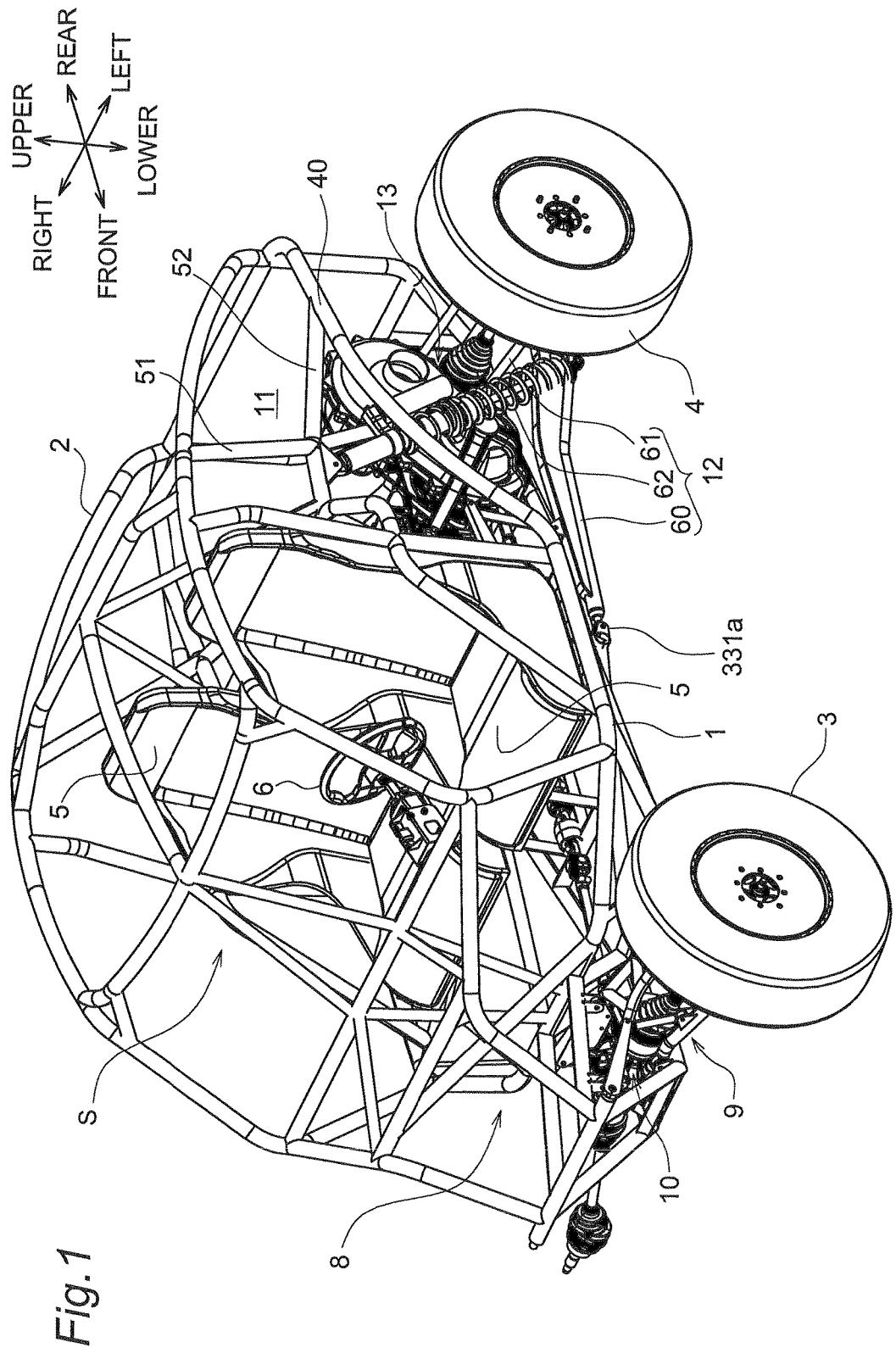
FIG. 1 is a front perspective view of a utility vehicle according to an embodiment of the present invention, depicting no outline member.

FIG. 1 is a front perspective view of the utility vehicle according to the embodiment of the present invention. The utility vehicle is depicted in a skeleton manner with outline members being excluded. FIG. 1 further includes neither right front and rear wheels, nor suspension devices configured to vertically swingably support these wheels, respectively. As depicted in FIG. 1, the utility vehicle has a framework including a vehicle body frame 1 extending anteroposteriorly, and a ROPS 2 surrounding the top of a riding space S. The ROPS is an abbreviation for a rollover protective structure.

The vehicle body frame 1 supports a pair of right and left front wheels 3 disposed at the front end, and a pair of right and left rear wheels 4 disposed at the rear end. The riding space S is provided between the pair of right and left front wheels 3 and the pair of right and left rear wheels 4. The riding space S accommodates a pair of right and left independent seats 5, and a steering wheel 6 disposed ahead of the seats 5.

The riding space S is provided thereahead with a bonnet chamber 8 surrounded with the pair of right and left front wheels 3 and a bonnet (not depicted). The bonnet chamber 8 accommodates a front wheel suspension device 9 vertically swingably supporting each of the front wheels 3, and a front wheel gear box 10 configured to transmit driving power to the right and left front wheels 3. FIG. 1 depicts the front wheel suspension device 9 with a shock absorber being excluded.

The riding space S is provided therebehind with an engine room 11 that is disposed between the pair of right and left rear wheels 4. The engine room 11 accommodates a pair of right and left rear wheel suspension devices 12 vertically swingably supporting the pair of right and left rear wheels 4, and a rear wheel gear box 13 configured to transmit driving power to the right and left rear wheels 4.

Figure 2:
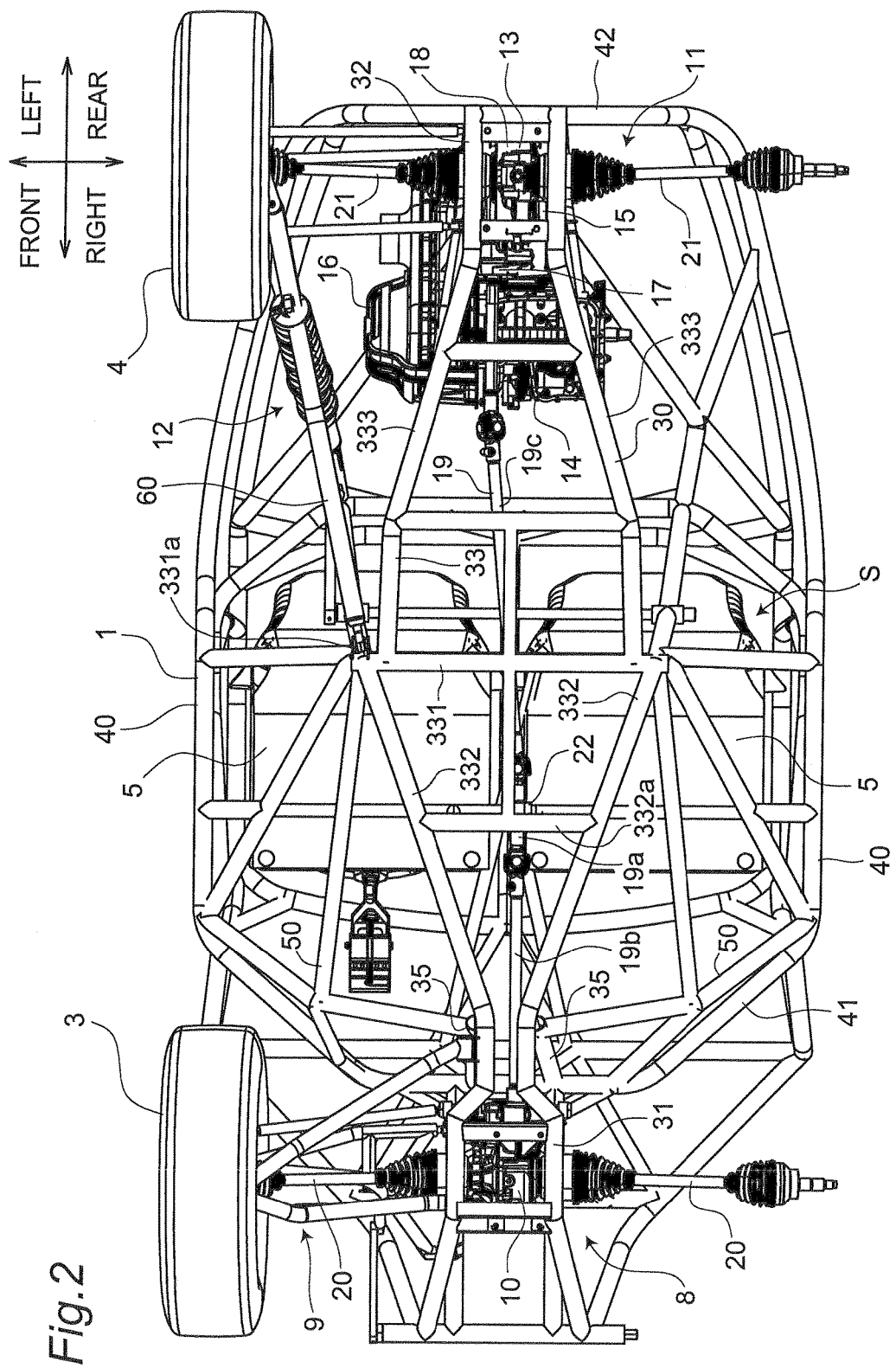
FIG. 2 is a bottom view from below, of the utility vehicle depicted in FIG. 1.

FIG. 2 is a bottom view from below, of the utility vehicle depicted in FIG. 1. As depicted in FIG. 2, the engine room 11 accommodates an engine 14, a transmission 15 positioned behind the engine 14, and a V-belt continuously variable transmission 16 disposed along left side surfaces of the engine 14 and the transmission 15. Driving power outputted from the engine 14 is transmitted to the transmission 15 via the V-belt continuously variable transmission 16. The transmission 15 transmits the driving power to a front wheel output unit 17 and a rear wheel output unit 18.

The front wheel output unit 17 is positioned ahead of the transmission 15. The front wheel output unit 17 is coupled with a propeller shaft 19 extending forward so as to transmit motive power, and transmits driving power from the front wheel output unit 17 to the front wheel gear box 10 via the propeller shaft 19. The rear wheel output unit 18 is positioned behind the transmission 15. The rear wheel output unit 18 is provided with the rear wheel gear box 13.

The front wheel gear box 10 and the rear wheel gear box 13 function as differential gears configured to distribute driving power to the right and left front wheels 3 and the right and left rear wheels 4. The front wheel gear box 10 is coupled with a pair of right and left front wheel drive shafts 20. Driving power transmitted from the propeller shaft 19 is distributed to the right and left front wheels 3 via the front wheel drive shafts 20. The rear wheel gear box 13 is similarly coupled with a pair of right and left rear wheel drive shafts 21. Driving power transmitted to the rear wheel output unit 18 is distributed to the right and left rear wheels 4 via the rear wheel drive shafts 21.

The propeller shaft 19 is divided into front and rear portions, namely, a front propeller shaft portion 19b and a rear propeller shaft portion 19c positioned ahead of and behind an intermediate propeller shaft portion 19a supported by a bearing 22 disposed below the seats 5. The propeller shaft portions 19a to 19c are coupled together by universal joints.

The vehicle body frame 1 has a bottom portion including a bottom main frame 30 disposed substantially at the center in the vehicle width direction and extending substantially horizontally anteroposteriorly, a pair of right and left bottom side frames 40 disposed at the outer ends in the vehicle width direction and extending anteroposteriorly between the front and rear wheels 3 and 4, and a pair of right and left coupling frames 50 coupling the bottom main frame 30 and the pair of right and left bottom side frames 40, respectively.

The vehicle body frame 1 further includes a bottom front frame 41 connected to the front ends of the bottom side frames 40 and positioned ahead of the riding space S, and a bottom rear frame 42 connected to the rear ends of the bottom side frames 40 and surrounding the engine room 11. The bottom front frame 41 has a U shape surrounding the front end of the riding space S and having a rear opening in a bottom view. The bottom rear frame 42 has a U shape surrounding the rear end of the engine room 11 and having a front opening in a bottom view.

The bottom main frame 30 is positioned between the pair of right and left front wheels 3 and between the pair of right and left rear wheels 4 in the vehicle width direction. The bottom main frame 30 includes a main frame front portion 31 positioned between the pair of right and left front wheels 3, a main frame rear portion 32 positioned between the pair of right and left rear wheels 4, and a main frame intermediate portion 33 positioned between the main frame front portion 31 and the main frame rear portion 32 and extending anteroposteriorly.

The main frame front portion 31 and the main frame rear portion 32 each have a rectangular shape in a bottom view. The main frame front portion 31 supports the bottom of the front wheel gear box 10. The main frame rear portion 32 supports the bottom of the rear wheel gear box 13.

The main frame intermediate portion 33 includes a cross member 331 located substantially at an intermediate position in the anteroposterior direction between the front wheels 3 and the rear wheels 4 and extending in the vehicle width direction, a pair of right and left anteroposterior front members 332 anteroposteriorly coupling the cross member 331 and the main frame front portion 31, and a pair of right and left anteroposterior rear members 333 anteroposteriorly coupling the cross member 331 and the main frame rear portion 32.

Specifically, the cross member 331 is positioned at rear portions of the seats 5 in a bottom view and extends from a substantially center of a first one of the seats 5 to a substantially center of a second one of the seats 5 in the vehicle width direction. The cross member 331 has the both ends in the vehicle width direction, each having a front portion firmly fixing, by welding or the like, the anteroposterior front member 332, and a rear portion firmly fixing, by welding or the like, a support portion 331a for a trailing arm 60 and the anteroposterior rear member 333 aligned in the mentioned order from the outer end in the vehicle width direction.

The anteroposterior front members 332 extend to slant inward in the vehicle width direction from the ends in the vehicle width direction of the cross member 331 toward the rear end of the main frame front portion 31. In other words, the pair of right and left anteroposterior front members 332 forms a gap therebetween in the vehicle width direction gradually narrowing toward the front ends. The pair of right and left anteroposterior front members 332 is coupled with each other by a front cross member 332a extending in the vehicle width direction. The front cross member 332a is positioned substantially at front portions of the seats 5.

The right and left anteroposterior front members 332 have the front ends coupled to the bottom front frame 41 by a pair of right and left vertical front members 35. The vertical front members 35 extend to slant forward toward the upper ends.

The anteroposterior rear members 333 extend to slant inward in the vehicle width direction from inner positions in the vehicle width direction of the support portions 331a of the cross member 331 toward the front end of the main frame rear portion 32. In other words, the pair of right and left anteroposterior rear members 333 forms a gap therebetween in the vehicle width direction gradually narrowing toward the rear ends.

[Rear Wheel Suspension Device]

Figure 3:
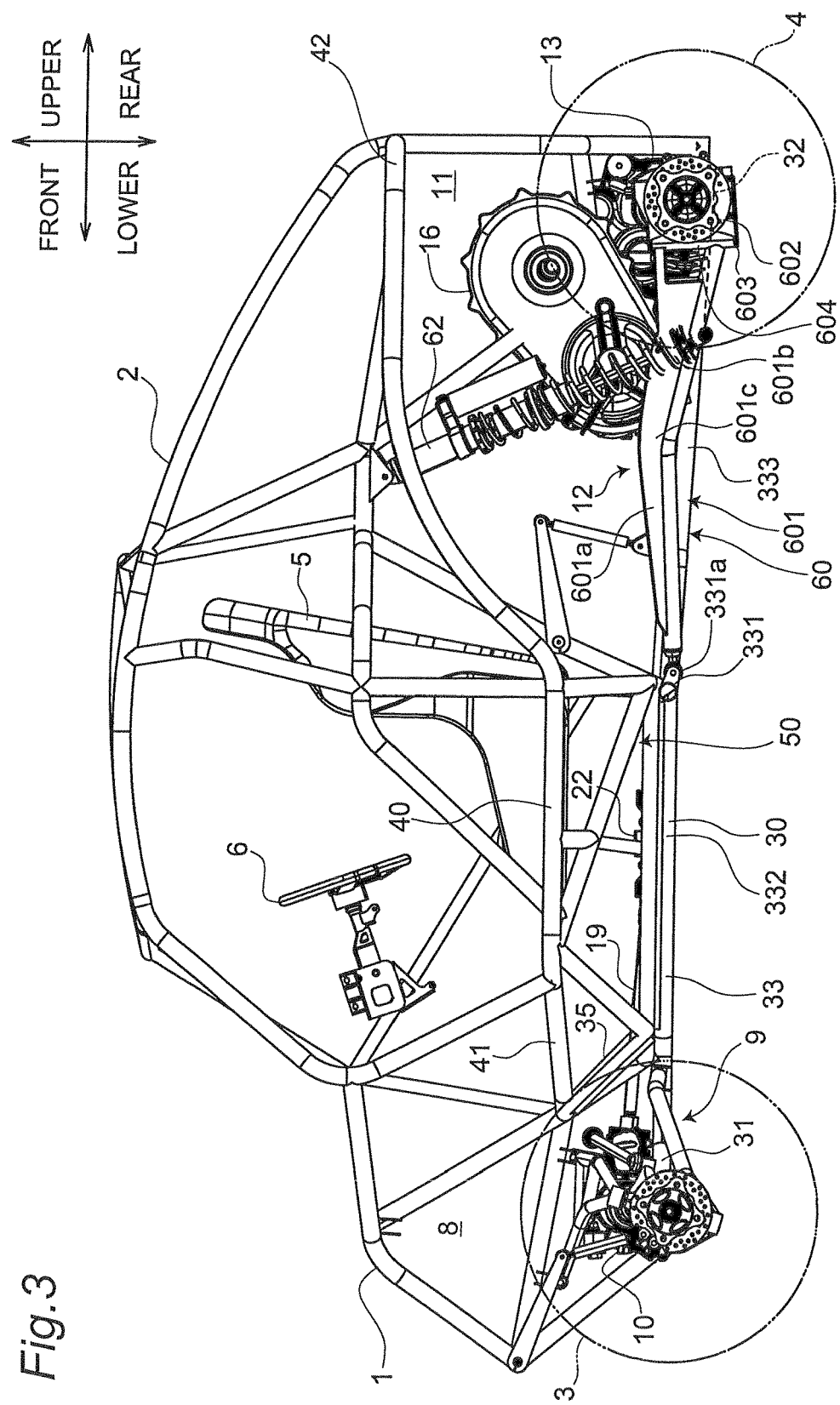
FIG. 3 is a left side view of the utility vehicle depicted in FIG. 1.
Figure 4:
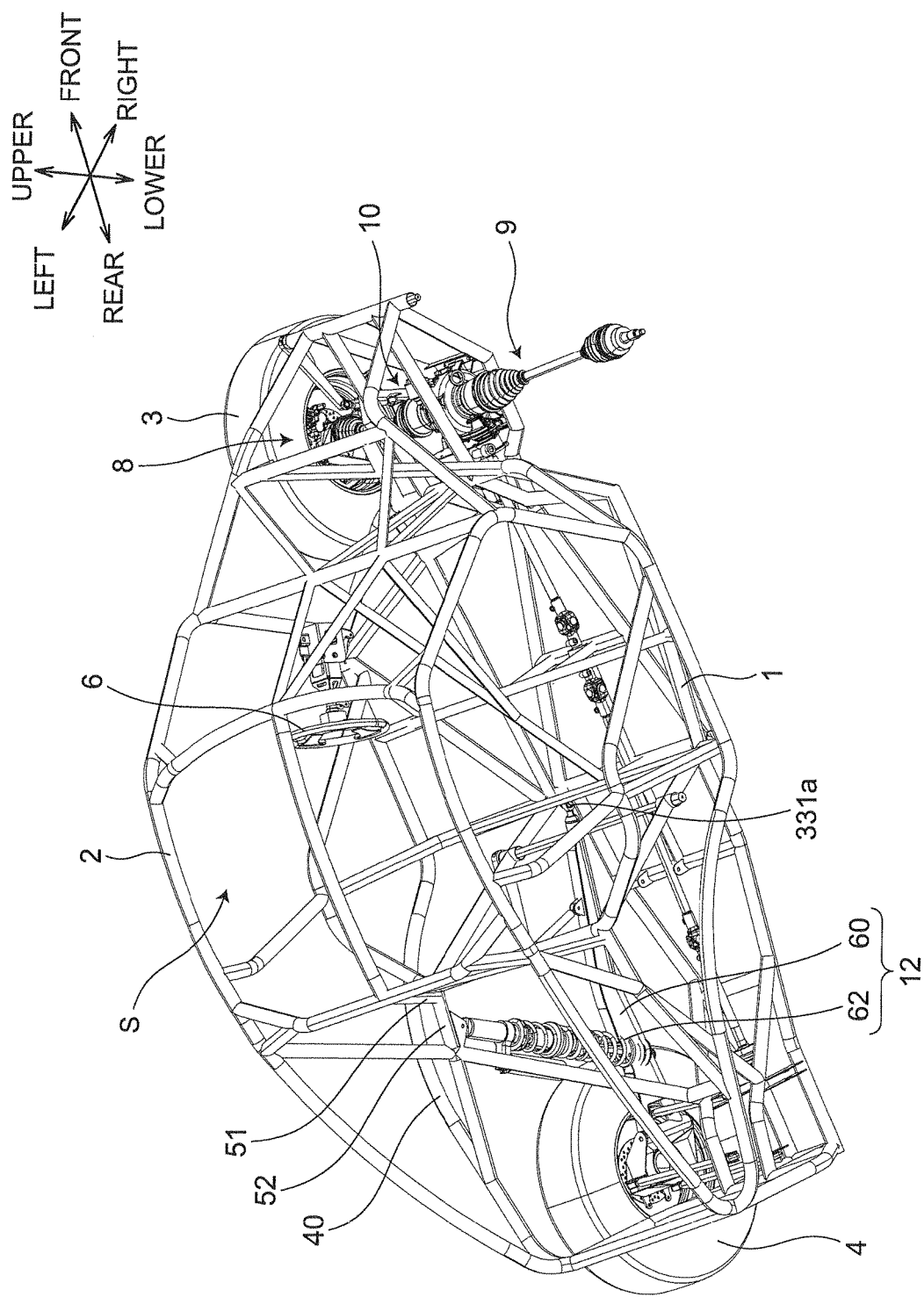
FIG. 4 is a rear perspective view of the utility vehicle, depicting a rear wheel suspension device.
Figure 5:
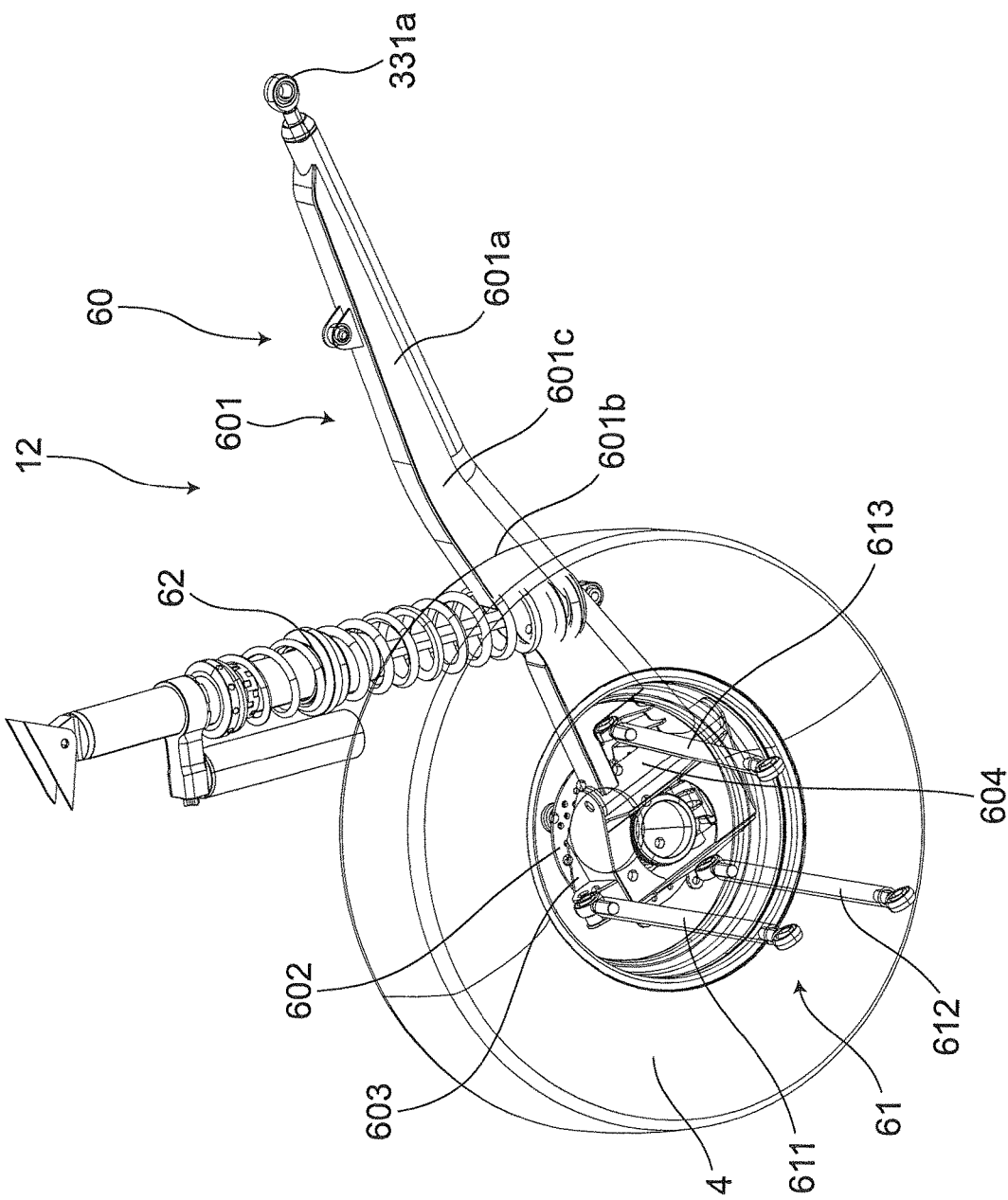
FIG. 5 is a perspective view of the rear wheel suspension device.
Figure 6:
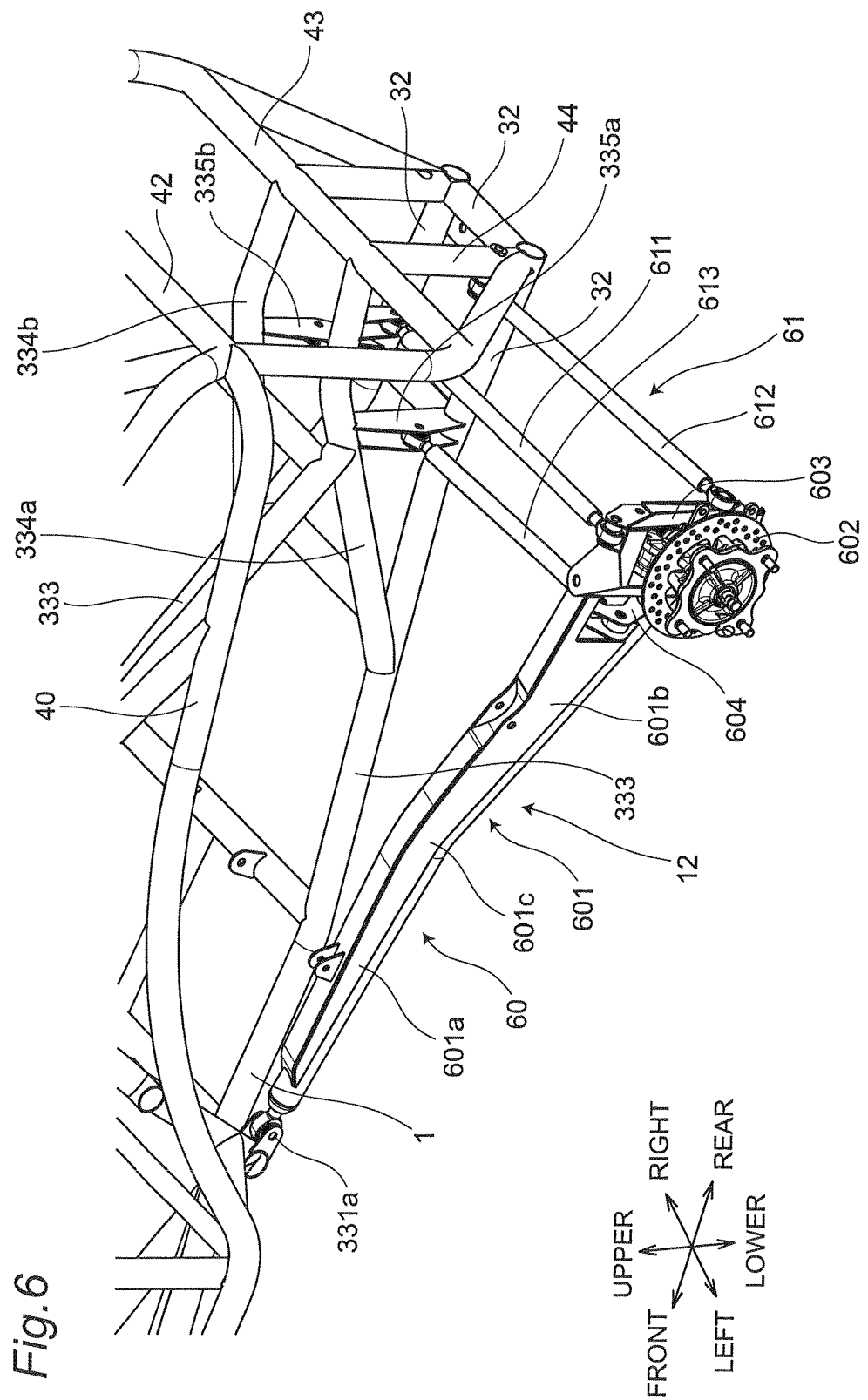
FIG. 6 is a perspective view depicting connection between the rear wheel suspension device and a frame.

FIG. 3 is a left side view of the utility vehicle depicted in FIG. 1, and FIG. 4 is a rear perspective view of the utility vehicle, depicting the rear wheel suspension device 12. FIG. 5 is a perspective view of the rear wheel suspension device 12, and FIG. 6 is a perspective view depicting connection between the rear wheel suspension device 12 and the vehicle body frame 1. As depicted in FIGS. 3 to 6, the rear wheel suspension device 12 includes the trailing arm 60 having a front end rotatably supported by the support portion 331a of the vehicle body frame 1 and extending backward, a plurality of toe control arms 61 extending in the vehicle width direction, and a shock absorber 62 elastically coupling the trailing arm 60 to the vehicle body frame 1.

The trailing arm 60 includes an arm 601 extending anteroposteriorly and supported by the vehicle body frame 1, a knuckle 603 rotatably supporting the rear wheel 4 with a hub 602 interposed therebetween, and a rotary shaft 604 configured to angularly displace the knuckle 603 in the vehicle width direction with respect to the arm 601. The rotary shaft 604 extends vertically and is configured to angularly displace the knuckle 603 in the vehicle width direction with respect to the arm 601 so as to change a toe angle of the rear wheel 4.

The arm 601 includes a front half 601a extending to gently slant upward from the support portion 331a toward the rear end, a rear half 601b positioned behind the front half 601a and extending to gently slant downward toward the rear end, and a bent portion 601c positioned between the front half 601a and the rear half 601b and bent to project upward. The arm 601 is positioned above the bottom surface of the anteroposterior rear member 333 of the vehicle body frame 1 in ahead of the rear wheel 4.

The toe control arms 61 include a first rod 611 and a second rod 612, which extend in the vehicle width direction, each have a first end supported by the vehicle body frame 1 via a universal joint, and a second end supported by the knuckle 603 via a universal joint, and are aligned to be paired vertically.

The first rod 611 is specifically supported by a coupling bracket 335b coupling the main frame rear portion 32 and an anteroposterior rear upper member 334b that has a front end coupled to an intermediate portion of the anteroposterior rear member 333 and a rear end coupled to a vehicle width rear member 43, and extends anteroposteriorly.

The second rod 612 is specifically supported by a vertical rear member 44 extending vertically and coupling the main frame rear portion 32 and the vehicle width rear member 43.

The toe control arms 61 further include a third rod 613 extending in the vehicle width direction and having a first end supported by the vehicle body frame 1 via a universal joint, and a second end supported by the arm 601 via a universal joint.

The third rod 613 is specifically supported by a coupling bracket 335a coupling the main frame rear portion 32 and an anteroposterior rear upper member 334a that has a front end coupled to an intermediate portion of the anteroposterior rear member 333 and a rear end coupled to the vehicle width rear member 43, and extends anteroposteriorly.

The third rod 613 is supported ahead of the center of the knuckle 603 whereas the first rod 611 and the second rod 612 are supported behind the center of the knuckle 603.

The shock absorber 62 has a first end supported by the vehicle body frame 1 and a second end supported by the arm 601. As depicted in FIGS. 1 and 4, the shock absorber 62 is specifically supported by a rear anteroposterior sub frame 52 that is coupled to the rear end of the bottom side frame 40, extends forward, and is coupled to a rear upright sub frame 51 coupled to the ROPS 2 and extending downward.

The suspension structure thus configured achieves the following effects.

(1) The rotary shaft 604 angularly displaces the knuckle 603 in the vehicle width direction with respect to the arm 601 to achieve higher toe controllability of the wheel 4.

(2) The toe control arms 61 include the first rod 611 and the second rod 612, which extend in the vehicle width direction, each have the first end supported by the vehicle body frame 1 and the second end supported by the knuckle 603, and are aligned to be paired vertically. The first rod 611 and the second rod 612 thus achieve control in change amount of a camber angle as well as toe control.

(3) The toe control arms 61 further include the third rod 613 extending in the vehicle width direction and having the first end supported by the vehicle body frame 1 and the second end supported by the arm 601. The third rod 613 thus achieves further improvement in toe controllability.

(4) Specifically, when the wheel comes close to the vehicle body, the first to third rods 611 to 613 angularly displace the knuckle 603 about the rotary shaft 604 to increase the toe angle of the wheel. When the wheel moves away from the vehicle body, the first to third rods 611 to 613 angularly displace the knuckle 603 about the rotary shaft 604 to decrease the toe angle of the wheel. The vehicle achieves higher turning performance through increase in toe angle of a first one of the wheels in the vehicle width direction and decrease in toe angle of a second one of the wheels in the vehicle width direction.

(5) The first rod 611 and the second rod 612 are supported behind the center of the knuckle 603 whereas the third rod 613 is supported ahead of the center of the knuckle 603. Specifically, the third rod 613 and the first and second rods 611 and 612 are supported by the knuckle 603 at positions shifted oppositely in the anteroposterior direction from the center of the knuckle 603, to easily achieve control in change amount of the camber angle with the first rod 611 and the second rod 612 as well as improvement in toe controllability with the third rod 613.

(6) The suspension structure includes the shock absorber 62 extending vertically and having the first end supported by the vehicle body frame 1 and the second end supported by the arm 601. The shock absorber 62 supported by the arm 601 can be reduced in size in comparison to a case of being supported by the knuckle 603.

(7) The first rod 611 and the second rod 612 are supported by the main frame rear portion 32 at the rear end of the vehicle body frame 1. The first rod 611 and the second rod 612 can thus easily have required length as well as avoid interference with a different member. This configuration easily achieves control in change amount of the camber angle as well as improvement in toe controllability.

(8) The arm 601 is bend to project upward, and is positioned above the bottom surface of the anteroposterior rear member 333 in ahead of the rear wheel 4, to have a high ground level. This configuration preferably prevents any obstacle on a road surface from contacting or caught by the arm 601 while the vehicle is traveling on an uneven ground.

The third rod 613 according to the embodiment described above has the second end supported by the arm 601. The second end is alternatively supported by the knuckle 603. In the case where the first rod 611 and the second rod 612 are supported behind the center of the knuckle 603, the third rod 613 is preferably supported ahead of the center of the knuckle 603.

The present invention can be modified or changed in various manners without departing from the spirit and scope of the present invention recited in the following patent claims.

The invention claimed is:

1. A suspension structure of a utility vehicle, comprising:
   a frame;
   a wheel;
   a trailing arm including an arm extending anteroposteriorly and supported by the frame, a knuckle rotatably supporting the wheel, and a rotary shaft configured to allow angular displacement of the knuckle in a vehicle width direction with respect to the arm;
   a first rod and a second rod aligned so as to be paired vertically with respect to the knuckle, each of the first and second rods extending in the vehicle width direction and having a first end supported by the frame and a second end supported by the knuckle; and a third rod extending in the vehicle width direction and having a first end supported by the frame and a second end supported ahead of a center of the knuckle, and wherein the first rod, the second rod and the third rod are placed within the wheel in side view and top view of the utility vehicle, and wherein the second end of the third rod is supported by the arm or the knuckle, and the first rod and the second rod are supported behind the center of the knuckle.

2. The suspension structure according to claim 1, further comprising:

a shock absorber extending vertically and having a first end supported by the frame and a second end supported by the arm.

* * * * *